United States Patent Office 3,482,964
Patented Dec. 9, 1969

3,482,964
PROCESS OF OBTAINING A GRANULAR CHARGE FOR THE BLAST FURNACE FROM A PYRITE CINDER AND IRON MANUFACTURE DUST OR POWDERED IRON ORE
Akitoshi Ishimitsu, Kinichi Sugahara, Saburo Arakawa, and Tadao Kitazawa, Kitakyushu, Japan, assignors to Yawata Iron & Steel Co., Ltd., and Kowaseiko Co., Ltd., both of Tokyo, Japan
No Drawing. Filed Mar. 3, 1967, Ser. No. 620,235
Int. Cl. C21b 1/08
U.S. Cl. 75—5                                           2 Claims

ABSTRACT OF THE DISCLOSURE

A process for obtaining from pyrite cinder, dye sludge or dusts from blast furnace, open-hearth furnace or converter a granular material for iron manufacture, that is, fired pellets having sufficient crush strength as of above 150 kg. per pellet, comprising charging and heating pellets composed of iron powders and calcium chloride added thereto at a temperature of 900 to 1100° C. for chloride-vaporization of metal impurities contained in the pellets and continuously firing the pellets in the rotary kiln at a temperature of 1200 to 1250° C. for at least 10 minutes.

---

This invention relates to a process of obtaining a granular raw material for iron manufacture from pyrite cinder, dye sludge or dusts from the blast furnace, open-hearth furnace or converter.

Pyrite cinder, dye sludge, dusts from the blast furnace, open-hearth furnace or converter, or iron powders can provide useful raw materials for iron manufacture, because they contain a large content of iron, and impurities contained therein can be removed by heating or roasting them in the presence of a chloride added.

Heretofore, several attempts were made to utilize iron powders as materials for iron manufacture by sintering or pelletizing them or roasting them in the presence of a chloride such as sodium chloride or calcium chloride. As one of the known methods there will be referred to a method, in which pellets are made from powdered iron, to which sodium chloride has been added, and the pellets are fired in a shaft kiln to produce the material for iron manufacture. However, in this prior art it was impossible to produce pellets having a strength required for the material as a charge for the blast furnace, as expressed, for instance, by a crush strength of more than 150 kg./pellet and tumbler strength of more than 92%, though it has been successful in removing copper and zinc from the material, for instance, pyrite cinder.

The firing of pellets in a shaft kiln was thought to be very desirable in view of high heat efficiency, the possibility of rapid heating and seal tightness. However, the inventors of the present invention have discovered that the firing of pellets in the shaft kiln is not so preferred as to obtain the material for use in the blast furnace having a large pressure resisting strength from pyrite cinder and other iron powders, particularly when using hematite only as the material due to the following difficulty.

Though the heating in the shaft kiln has an advantage that the temperature in the kiln may be rapidly raised up, the raising of the temperature must be limited to a maximum of 1100° C. for the necessity of preventing the occurrence of hangings due to the fusion or adhesion of pellets amongst themselves caused by the melting of added chloride contained in the pellets. In particular, the above mentioned limitation on the temperature in the kiln, in which chloridizing-vaporation of impurities contained in pellets is to be performed, is a fatal disadvantage for obtaining a charge to be used for the blast furnace. For instance, when firing pellets prepared by adding calcium chloride to pyrite cinder in the shaft kiln, the strength of the pellets obtained by firing the same may be to the utmost a crush strength of 60 to 100 kg./pellet, which is however, of no use as a charge for the blast furnace.

It is an object of the present invention to provide a process for efficiently obtaining from pyrite cinder, dusts from blast furnace, open-hearth furnace or converter or powdered iron ores a raw material having high strength sufficient as a charge for the blast furnace.

It is another object of the present invention to provide a process for producing pellets having a high strength sufficient as a charge for the blast furnace from pyrite cinder, dusts from blast furnace, open-hearth furnace or converter or powdered iron ores by preparing the pellets from them with a reduced addition of chloride and firing the pellets in a rotary kiln.

It is still another object of the present invention to provide a process for producing pellets having a high strength sufficient as a charge for the blast furnace, from which impurities have been effectively removed.

It is still another object of the present invention to provide a process for economically producing pellets having high strength sufficient as a charge for the blast furnace from hematite only.

It is still another object of the present invention to provide a process for producing so-called self-fluxing briquette containing calcium chloride.

The details of the present invention will be elucidated by the following explanation.

In the process according to the present invention a mixture prepared by adding chloride such as calcium chloride or ferrous chloride and calcium hydroxide or calcium oxide to pyrite cinder, dye sludge, dusts from blast furnace, open-hearth furnace or converter, powdered iron ores is pelletized and the thus obtained pellets are dried at a temperature not exceeding 250° C. to at most 5% of the moisture content, to thereby impart to the pellets a strength sufficient to prevent them from being broken at the operations of sieving and charging in a kiln. The dried pellets are charged into a rotary kiln and heated therein at a temperature of 900 to 100° C. to effect the chloridization-vaporation of impurities contained in the pellets. Then the thus treated pellets are continuously heated in the rotary kiln at a temperature of 1200 to 1250° C. for at least 10 minutes, thereby the pellets having a high strength of more than 150 kg./pellet can be obtained.

Each step constituting the process of the present invention, the addition of chloride such as sodium chloride or calcium chloride to iron powders, pelletizing of the mixture drying of the pellets and chloridization-vaporation of impurities contained in the pellets and firing in a rotary kiln, may have been already used in the prior art. However, heretofore it has never been succeeded in obtaining such pellets having a high strength as 150 kg./pellet which is suffiicent to impart to the pellets the capability of being used as a charge for the blast furnace, from iron powders.

The present invention has first succeeded in obtaining pellets of such high strength as 150 kg./pellet, that is, in achieving an unexpected result by combining the above-mentioned steps.

The success of the present invention of having obtained pellets having high strength and a low content of impurities is due to the feature of the present invention that by firing pellets composed of iron powders and calcium chloride in a rotary kiln the pellets can be heated up to 1250° C. without a fear of causing fusion or adhesion among themselves on account of the pellets being continuously moved and rolled in the kiln, and meanwhile the removal of impurities contained in the pellets can be effectively achieved because chlorine gas generated from the decomposition of calcium chloride reacts sufficiently with impurities without the chlorine gas being diluted by the heating gas, thereby the chloridization-vaporation of the impurities (hereinafter it is designated as chloride vaporation for the sake of simplicity) can be performed. Consequently any useless decomposition of calcium chloride is suppressed, resulting in the remarkable reduction of the addition of calcium chloride even to a half of the addition thereof in the prior art, that is, to the calcium chloride content of 3.5% by weight, which is also an unexpected advantage by the present invention.

An iron manufacturing, raw material, to which the process of our invention is applicable, is a powdered raw material, more particularly, containing metal impurities capable of forming readily chlorides at the processing temperature of our invention, for example, copper, lead and zinc. It will be understood that pyrite cinders, dye sludges and dusts from the iron manufacturing blast furnace, open-hearth furnace and converter are favourably processed by the invention, but powdered iron ores are similarly processed.

The above described iron manufacturing, powdered raw materials have the following compositions respectively, as shown in Table 1, and each is mixed with calcium chloride or ferrous chloride and calcium hydroxide or calcium oxide, followed by pelletizing in the presence of a suitable amount of water. The amount of the chloride may be varied depending on that of the metal impurities contained in the raw material and that of calcium to be present in the pellet, but in general, 3 to 15% of calcium chloride by weight is added. In carrying out the chloride vaporization in a rotary kiln, 3.5% by weight of calcium chloride is sufficient.

TABLE 1.—COMPOSITIONS OF RAW MATERIALS FOR IRON MANUFACTURE

| | T.Fe | FeO | Zn | Cu | P | S | T.C |
|---|---|---|---|---|---|---|---|
| Pyrite cinder | 60.0 | 0.5 | 0.7 | 0.5 | | 0.8 | |
| Dye sludge | 60.0 | 5.2 | | 0.09 | 0.09 | 0.16 | |
| Open-hearth furnace sludge | 57.3 | 2.2 | 3.7 | 0.15 | 0.16 | 0.3 | |
| Converter sludge | 66.4 | 15.7 | 0.06 | 0.06 | 0.14 | 0.08 | |
| Blast furnace thickener ash | 34.1 | 11.3 | 3.6 | 0.05 | 0.07 | 0.7 | 23.2 |

When a powdered raw material for iron manufacture contains large amounts of metal impurities and calcium chloride is added in amounts corresponding thereto, the amount of calcium is too great to permit the pellet to be obtained. In this case, therefore, calcium chloride is added so as to give a desired level of calcium and the remainder of chlorine necessary may be supplemented by the use of chlorine gas in the chloride firing.

In the application of our invention, a powdered raw material for iron manufacture containing 0.7 to 8% Cu, 0.7 to 8% Zn and 1% or less Pb by weight is preferred. As a chloride is employed preferably calcium chloride or ferrous chloride and calcium hydroxide or calcium oxide. The use of magnesium chloride and sodium chloride should be avoided in our invention, since the former decomposes at a low temperature and the latter tends to damage the furnace wall.

The thus formed pellet has a moisture content of 12 to 18% and has a crush strength of only 2 to 6 kg., resistant to some transportation. When this pellet is then dried or heated at a temperature of less than 250° C. for 10 to 30 minutes until the moisture content is less than 5%, preferably less than 1% by weight, its crush strength is increased to 20 to 50 kg. due to the deposition of calcium chloride. Since this dried pellet has a strength sufficient to be sieved, the separation from powder parts can be effected by sieving before charging the dried pellets to a kiln. Moreover, the handling of pellets is easy and the cracking and powdering do not occur at the charge to a kiln, which result in ease of the kiln operation, lengthening of the life of the kiln and a reduction of number of the kiln cleaning required.

The drying temperature depends on the capacity of the kiln but a range of 150 to 250° C. is preferred on a commercial scale. At above 250° C., the decomposition of calcium chloride occurs. A rapid vaporization of water in the pellet causes cracking, breaking and powdering thereof.

In the present invention the pellets to be fired are adequately dried prior to the firing and the action of calcium chloride as a binder is utilized to increase the strength thereof. The handling of the raw pellets is very easy and the firing is effected relatively readily. The calcium chloride used in the invention not only increases the strength of a raw pellet, but also plays a role of removing metal impurities such as copper and zinc in the subsequent chloride vaporization as well as utilizing the calcium component thereof, while bentonite used in the prior art only increases the strength of a pellet.

The breaking and powdering of pellets should be avoided in the practice of the invention because it causes fusion of formation of kiln rings.

The dried pellets are further charged to a kiln, where they are heated or fired at 1100° C. in an oxidizing, weakly oxidizing or neutral atmosphere. A reducing atmosphere, causing elimination of copper, is not favorable. In this case, when the temperature of an exhaust gas from the kiln lowers to below 500° C., the chlorides vaporized from the charge condense or deposit.

It is most preferred that the chloride vaporization and high temperature firing be performed continuously in a rotary kiln, but they may be separately performed in a shaft kiln and rotary kiln respectively as far as the handling of pellets between the chloride vaporization and high temperature firing is favorably conducted. In carrying out the chloride vaporization and high temperature firing in a rotary kiln, the distribution of temperatures is so maintained that a preheating zone, chlorination reaction zone of metal impurities, chloride vaporizing zone and pellet strengthening and bonding zone are formed in the kiln.

Firstly, the pellets are subjected to decomposition of the calcium chloride contained therein in the preheating zone and preheated to a temperature sufficient to react the decomposed chlorine with the metal impurities in the pellets such as copper, lead and zinc. In general, such decomposition and reaction are carried out at approximately 800° C.

The pellets are then removed to a zone maintained at 900° C. in the rotary kiln, where the chlorides are vaporized, and the vaporization is accomplished at a temperature up to 1100° C. The chlorides in the pellets are completely vaporized while the temperature is raised from 900 to 1100° C. for 10 minutes.

The thus metal impurities removed pellets are further heated and exposed to a temperature of 1200 to 1250° C. for 10 minutes or more to thereby increase the crush strength to 150 to 350 kg./pellet through slag-bonding, formation of calcium ferrite and diffusion bonding and to thereby remove sulfur contents therefrom if present.

The above described temperature range of 1200 to 1250° C. is very important in the high temperature firing, because at above 1250° C., the raw material is fused or bonded with the wall to form rings, while at below 1200° C., a sufficient increase of the strength cannot be obtained, far from the object of our invention, as shown in Table 2. The residence time in the rotary kiln is about 1 hour in the preheating zone, about 30 minutes in the chloride vaporization zone and about 30 minutes in the high temperature firing zone, the sum thereof being about 2 hours. In our invention, the high temperature firing of pellets, in particular, should be carried out in a rotary kiln. Fomation of clinkers and hanging occur often in other furnaces. In a rotary kiln wherein the pellets are tightly rolled, each pellet is highly compacted, grown through the adhesion of powder to the surface thereof and fired well without bonding to each other in spite of the high temperature of 1200 to 1250° C., resulting in a remarkable increase of the pellet strength so as to be suitable for use as a charge for the blast furnace.

If such firing of pellets is carried out in the conventional shaft kiln, the bonding of the pellets to each other by fusion will occur at a temperature of about 1150° C. and even the pellets to which calcium chloride is added give only a crush strength of 60 to 100 kg./pellet and tumbler strength of 60 to 70% at firing at 1000° C. It will be understood apparently that such product is not suited for a charge for the blast furnace. In Table 2 is shown the crush strength of the pellet fired in a rotary kiln in accordance with the process of our invention, from which it is evident that the firings at 1250° C. for at least 10 minutes bring remarkable increases in the pressure resisting strength or crush strength/pellet. An oxidizing, weakly oxidizing or neutral atmosphere is desired for the high temperature firing in a rotary kiln.

TABLE 2.—FIRING CONDITION AND CRUSH STRENGTH OF PELLET

| | Temperature (° C.) | | | | | |
|---|---|---|---|---|---|---|
| | 1,000, kg. | 1,100, kg. | 1,150, kg. | 1,200, kg. | 1,225, kg. | 1,250, kg. |
| Time (min.): | | | | | | |
| 10 | 24 | 35 | 50 | 150 | 200 | 300 |
| 20 | 26 | 40 | 55 | 180 | 220 | 500 |
| 30 | 29 | 50 | 65 | 200 | 250 | 700 |
| 60 | 32 | 55 | 75 | 260 | 330 | 1,000 |

The present invention will now be illustrated by the following example.

Raw materials were blended in accordance with the formula as shown in Table 3.

TABLE 3.—RAW MATERIALS AND BLEND PROPORTION

| | Raw materials | | | | | | | | | |
|---|---|---|---|---|---|---|---|---|---|---|
| | T. Fe | FeO | Cu | Zn | As | SiO$_2$ | S | CaO | Ag | Percent |
| Pyrite cinder A | 60.0 | 0.50 | 0.5 | 0.70 | 0.0075 | 5.0 | 0.8 | 0.2 | 40 g./t. | 72 |
| Pyrite cinder A | 64.0 | 24.0 | 0.4 | 0.50 | 0.04 | 4.0 | 1.5 | 0.5 | 1.3 | 6 |
| Powdered magnetite | 59.5 | 25.0 | | | | 14.0 | | 0.5 | | 11 |
| Open-heatth furnace sludge | 57.0 | | 0.2 | 8.0 | 0.04 | 1.0 | 1.5 | 4.5 | | 7 |

The average composition of the raw materials blended was as follows:

TABLE 4.—AVERAGE COMPOSITION OF THE RAW MATERIALS BLENDED

| | | |
|---|---|---|
| T. Fe | percent | 55.9 |
| FeO | do | 4.55 |
| Cu | do | 0.46 |
| Zn | do | 0.85 |
| SiO$_2$ | do | 5.42 |
| S | do | 0.73 |
| Au | g./t. | 0.3 |
| Ag | g./t. | 29 |
| CaCl$_2$ | percent | 7.0 |

The thus prepared raw material was pelletized to a grain size of 15 m./m. in diameter by means of a pan-type granulator. Its moisture content was 16% and crush strength 25 kg. The resulting pellets were heated and dried at a temperature of 150 to 250° C. for 30 minutes to lower the moisture content to 0.5%. The crush strength increased to 35 kg. The dried pellets were charged to a rotary kiln at a rate of 130 kg./hr. and fired while maintaining the temperature of the exhaust gas at 750° C., the number of revolutions of the kiln at 1 r.p.m., the residence time of the charge in the kiln for 80 minutes and the maximum firing temperature at 1220° C. for about 20 minutes. The thus fired pellets showed the following properties.

TABLE 5.—PROPERTIES OF THE FIRED PELLETS

Bulk specific gravity: 20 kg./l.
Crush strength: 300 kg.
Tumbler strength: 96% (+5 m./m.)

| | T. Fe, Percent | Fe O, Percent | Cu, Percent | Zn, Percent | S, Percent | Au, Percent | Ag, Percent |
|---|---|---|---|---|---|---|---|
| Composition | 61.2 | 0.8 | 0.02 | 0.02 | 0.05 | 0.05 | 7 |
| Removed ratio | | | 96 | 98 | 93.7 | 84.7 | 78 |

Having thus described the invention, what is claimed is:

1. A process for obtaining a pelletized material suitable for a furnace charge from a particular substance selected from the group consisting of pyrite cinder, dust from an iron manufacturing process, dye sludge and powdered iron ore said particulate substance containing as impurities, 0.7 to 8% copper, 0.7 to 8% zinc and up to 1% lead, which consists essentially of the sequential steps of:

(1) adding a material selected from the group consisting of calcium chloride, ferrous chloride, mixtures thereof, mixtures of said calcium chloride or ferrous chloride with calcium hydroxide and mixtures of said calcium chloride or ferrous chloride with calcium oxide to said particulate substance;

(2) pelletizing the resulting mixture;

(3) drying the pellets at a temperature of less than 250° C. until the moisture content reaches at most 1%, thereby increasing the strength of the pellets;

(4) charging and heating the dried pellets in a neutral or oxidizing atmosphere in a kiln at a temperature of 900 to 1100° C. to chloridize-vaporize the metal impurities contained therein; and, (5) firing the pellets in a rotary kiln in a neutral or oxidizing atmosphere at a temperature of 1200 to 1250° C. for at least 10 minutes, whereby to produce pellets having a crush strength of more than 150 kg./pellet.

2. A process according to claim 1 wherein steps 4 and 5 are both carried out in the same rotary kiln.

(References on following page)

References Cited

UNITED STATES PATENTS 2,888,341  5/1959  Lawless et al. _____ 75—3
3,318,685  5/1967  Handwerk _____ 75—3

OSCAR R. VERTIZ, Primary Examiner
G. O. PETERS, Assistant Examiner

U.S. Cl. X.R.

75—3, 25